(12) United States Patent
Kim et al.

(10) Patent No.: US 9,001,300 B2
(45) Date of Patent: *Apr. 7, 2015

(54) LIQUID CRYSTAL DISPLAY

(75) Inventors: Dong-Gyu Kim, Kyungki-do (KR);
Sang-Soo Kim, Seoul (KR);
Sang-Wook Lee, Kyungki-do (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/336,817

(22) Filed: Dec. 17, 2008

(65) Prior Publication Data
US 2009/0161057 A1  Jun. 25, 2009

Related U.S. Application Data

(60) Continuation of application No. 11/657,275, filed on Jan. 23, 2007, now Pat. No. 7,477,351, which is a division of application No. 10/851,642, filed on May 24, 2004, now Pat. No. 7,170,570, which is a
(Continued)

(30) Foreign Application Priority Data

Jul. 27, 2000 (KR) .................. 10-2000-0043508

(51) Int. Cl.
*G02F 1/1345* (2006.01)
*G02F 1/1362* (2006.01)

(52) U.S. Cl.
CPC .......... *G02F 1/13458* (2013.01); *G02F 1/1345* (2013.01); *G02F 1/13452* (2013.01); *G02F 1/136286* (2013.01)

(58) Field of Classification Search
USPC .................. 349/149, 150, 151, 152
See application file for complete search history.

(56) References Cited

U.S. PATENT DOCUMENTS

| | | | | |
|---|---|---|---|---|
| 5,745,202 A | * | 4/1998 | Yamauchi et al. | 349/110 |
| 5,815,223 A | * | 9/1998 | Watanabe et al. | 349/42 |
| 5,835,177 A | * | 11/1998 | Dohjo et al. | 349/147 |
| 5,850,275 A | * | 12/1998 | Watanabe et al. | 349/152 |

(Continued)

FOREIGN PATENT DOCUMENTS

| | | |
|---|---|---|
| JP | 04218933 | 8/1992 |
| JP | 06242462 | 9/1994 |

(Continued)

*Primary Examiner* — Edward Glick
*Assistant Examiner* — David Chung
(74) *Attorney, Agent, or Firm* — Innovation Counsel LLP

(57) ABSTRACT

A liquid crystal display includes an insulating substrate, gate and data lines formed on the substrate to define pixel areas, or collectively a display area. Gate signal interconnection wires are formed at a corner portion of the substrate outside the display area to transmit gate electrical signals, and provided with gate signal interconnection lines and first and second gate signal interconnection pads connected to both ends of the gate signal interconnection lines. A gate insulating layer, and a protective layer are further formed on the substrate, and provided with first and second contact holes exposing the first and second gate signal interconnection pads. Gate and data signal transmission films are attached to the substrate, and provided with first and second gate signal leads and first and second gate signal wires. The first and second gate signal leads are connected to the first and second gate signal interconnection pads through the first and second contact holes. The first or the second gate signal lead completely covers the first or the second contact hole at least in the longitudinal direction of the lead.

31 Claims, 10 Drawing Sheets

Related U.S. Application Data continuation of application No. 10/351,525, filed on Jan. 27, 2003, now Pat. No. 6,741,309, which is a continuation of application No. 09/901,127, filed on Jul. 10, 2001, now Pat. No. 6,636,288.

(56) References Cited

U.S. PATENT DOCUMENTS

| | | | |
|---|---|---|---|
| 6,079,840 A * | 6/2000 | Ono et al. | 362/607 |
| 6,163,356 A * | 12/2000 | Song et al. | 349/152 |
| 6,262,702 B1 * | 7/2001 | Murade | 345/87 |
| 6,281,959 B1 | 8/2001 | Kim et al. | |
| 6,310,666 B1 * | 10/2001 | Moon | 349/40 |
| 6,366,331 B1 * | 4/2002 | Sakamoto et al. | 349/43 |
| 6,590,629 B1 * | 7/2003 | Hirobe et al. | 349/149 |
| 6,636,288 B2 * | 10/2003 | Kim et al. | 349/139 |
| 6,639,589 B1 * | 10/2003 | Kim et al. | 345/206 |

FOREIGN PATENT DOCUMENTS

| | | |
|---|---|---|
| JP | 08242468 | 9/1996 |
| JP | 09054333 | 2/1997 |
| JP | 10010564 | 1/1998 |
| JP | 10253992 | 9/1998 |
| JP | 10268353 | 10/1998 |
| JP | 11281994 A * | 10/1999 |
| JP | 2001083548 | 3/2001 |

* cited by examiner

LIQUID CRYSTAL DISPLAY

CROSS-REFERENCE TO RELATED APPLICATION

This application is a Continuation Application of co-pending U.S. patent application Ser. No. 11/657,275 filed on Jan. 23, 2007, which is a Divisional Application of U.S. patent application Ser. No. 10/851,642, filed on May 24, 2004, now U.S. Pat. No. 7,170,507, which is a Continuation Application of U.S. patent application Ser. No. 10/351,525, filed Jan. 27, 2003, now U.S. Pat. No. 6,741,309, which is a Continuation Application of U.S. patent application Ser. No. 09/901,127, filed Jul. 10, 2001, now U.S. Pat. No. 6,636,288, which claims priority to corresponding Korean Patent Application No. 2000-43508 filed in the Korean Intellectual Property Office, Republic of Korea, on Jul. 27, 2000, all of which are hereby incorporated by reference in their entirety.

BACKGROUND OF THE INVENTION (a) Field of the Invention

The present invention relates to a liquid crystal display and a method for fabricating the same and, more particularly, to a liquid crystal display showing good performance characteristics.

(b) Description of the Related Art

A liquid crystal display is one of the flat panel displays that have been currently used in a most extensive manner. Such a liquid crystal display basically has two glass substrates with electrodes for generating electric fields, a liquid crystal layer sandwiched between the substrates, and polarizing plates externally attached to the substrates. When voltage is applied to the electrodes, the liquid crystal molecules are re-oriented to thereby control light transmission.

One of the substrates is provided with an array of thin film transistors (TFTs) for switching voltages applied to the electrodes.

The TFT array substrate has a plurality of gate and data lines proceeding in the horizontal and vertical directions, respectively. The data lines cross over the gate lines to thereby define pixel areas, and pixel electrodes are formed at the pixel areas. The TFTs control picture signals transmitted thereto through the data lines in accordance with scanning signals transmitted thereto through the gate lines, and sends the picture signals to the pixel electrodes. The display area may be outlined by the set of the pixel areas surrounded by the wiring lines. A plurality of gate and data pads are formed at the TFT array substrate external to the display area while being connected to the gate and data lines. The gate and data pads are directly connected to external driving ICs to receive scanning signals and picture signals from the outside, and transmit the signals to the relevant signal lines.

A gate printed circuit board, and a data printed circuit board are provided external to the TFT array substrate to transmit relevant signals thereto. A data signal transmission film interconnects the TFT array substrate with the data printed circuit board, and a data driving IC is mounted on the data signal transmission film to convert electrical signals into data signals, and send the data signals to the data pads and the data lines. Furthermore, gate signal transmission films connect the TFT array substrate with the gate printed circuit board, and gate driving ICs are mounted on the gate signal transmission films to convert electrical signals into gate signals, and send the gate signals to the gate pads and the gate lines. Gate signal pads, and data signal pads are aligned with the gate and data pads in a one to one correspondence, and connected thereto through thermal compression process using an anisotropic conductive film (ACF).

Meanwhile, the gate printed circuit board may be omitted. In this case, the data printed circuit board generates gate signals, and sends the signals to the gate signal transmission film. Gate signal wires for transmitting the gate signals are formed at the data signal transmission film connected to the data printed circuit board. Gate signal interconnection wires are formed at the TFT array substrate to connect the gate signal lines of the gate signal transmission films with the gate signal wires. The gate signal wires, and the gate signal interconnection wires are connected to each other to receive gate signals from the data printed circuit board, and transmit the signals to the gate driving ICs.

However, in the above structure, corrosion should not occur at both pad portions of the gate signal interconnection wires interconnecting the gate signal lines and the gate signal wires to obtain good contact characteristics, and the thermal compression process using the ACF should be performed in a stable manner.

SUMMARY OF THE INVENTION

It is an object of the present invention to provide a liquid crystal display which involves good contact characteristics.

It is another object of the present invention to provide a liquid crystal display where gate signal interconnection pads are covered by leads of gate and data signal transmission films, or stepped difference at the contact portions is minimized.

These and other objects may be achieved by a liquid crystal display with an insulating substrate. The substrate is overlaid with a plurality of gate lines, and a plurality of data lines crossing over the gate lines to define pixel areas. A gate signal interconnection line assembly is formed at the substrate. The gate signal interconnection line assembly is provided with gate signal interconnection lines, and first and second gate signal interconnection pads connected to both ends of the gate signal interconnection lines to relay gate electrical signals to the gate lines. Insulating layers are formed on the substrate while bearing first and second contact holes exposing the first and second gate signal interconnection pads. Gate signal transmission films are attached to the substrate while each mounting a gate driving integrated circuit thereon to receive gate electrical signals and send gate signals to the gate lines. Each gate transmission film has first gate signal wires, and first gate signal leads connected to the first gate signal interconnection pads through the first contact holes. Data signal transmission films are attached to the substrate with second gate signal wires, and second gate signal leads connected to the second gate signal interconnection pads through the second contact holes. The first or the second gate signal lead completely covers the first or the second contact hole at least in the longitudinal direction of the lead.

The liquid crystal display further includes a printed circuit board connected to the data signal transmission films to send the gate and data electrical signals to the gate driving integrated circuits and the data driving integrated circuit.

Pixel electrodes are formed on the insulating layer at the pixel areas. First and second subsidiary gate signal interconnection pads are formed at the same plane as the pixel electrodes while covering the first and second contact holes. The first and second subsidiary gate signal interconnection pads are positioned between the first and second gate signal interconnection pads and the first and second gate signal leads, respectively.

The insulating layers are formed with a gate insulating layer covering the gate lines, and a protective layer covering the data lines over the gate insulating layer. The first or the second gate signal lead completely covers at least one side of each contact hole in the longitudinal direction. The gate signal interconnection line assembly may be formed at the same plane as the gate lines or the data lines, and provided with first gate signal interconnection lines placed at the same plane as the gate lines, and second gate signal interconnection lines placed at the same plane as the data lines. The first and the second gate signal interconnection lines are connected to each other via the first and second subsidiary gate signal interconnection pads.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
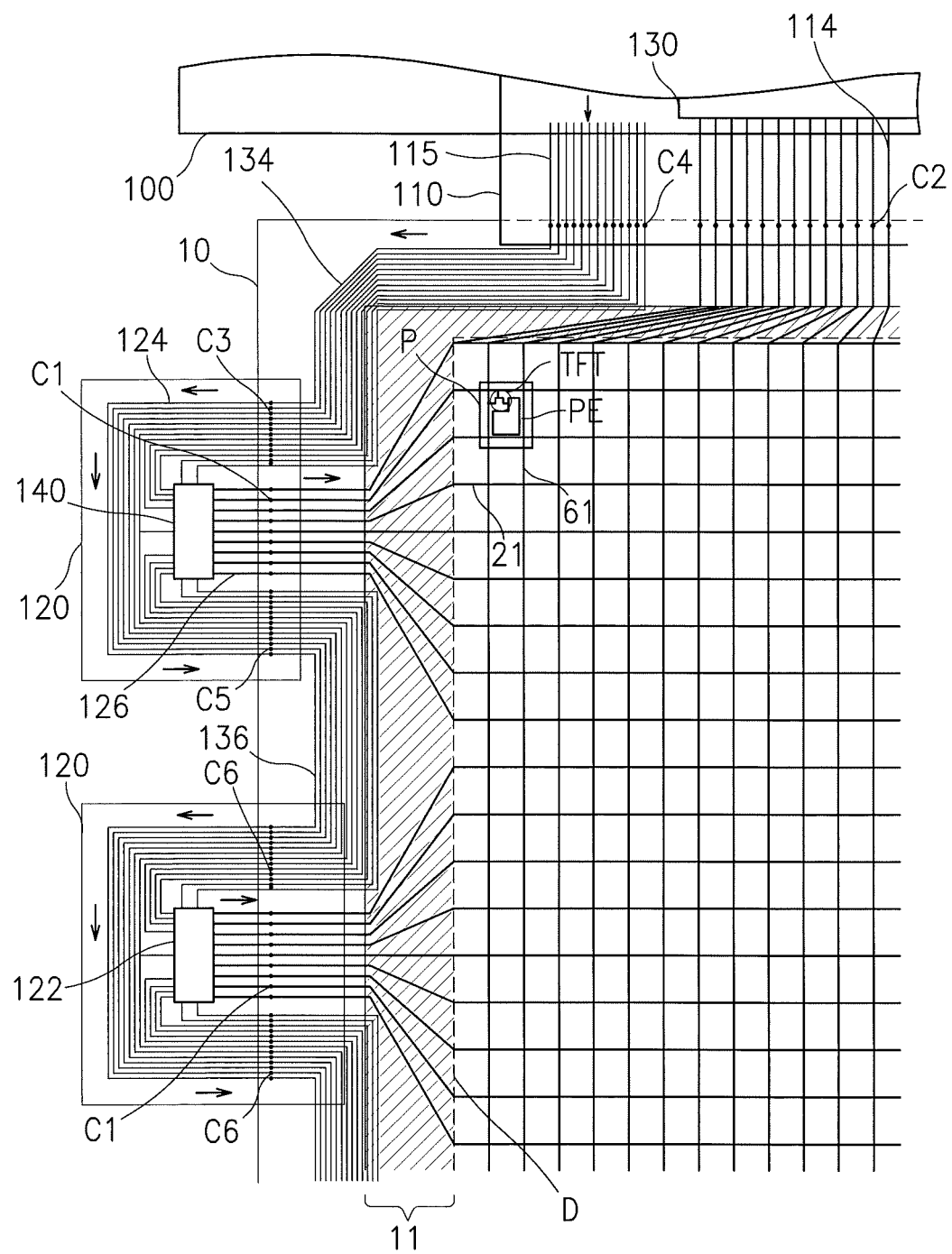
FIG. 1 is a plan view of a TFT array substrate for a liquid crystal display according to a first preferred embodiment of the present invention.

FIG. 1 schematically illustrates a TFT array substrate for a liquid crystal display according to a first preferred embodiment of the present invention.

As shown in FIG. 1, a plurality of gate lines 21 are formed on an insulating substrate 10 in the horizontal direction, and a plurality of data lines 61 proceed in the vertical direction while being electrically insulated from the gate lines 21.

The data lines 61 cross over the gate lines 21 to thereby define pixel areas P, and the pixel areas P collectively form a display area D. A thin film transistor TFT is formed at each pixel area P while being connected to the gate lines 21 and the data lines 61. A pixel electrode PE is also provided at each pixel area while being connected to the TFT. A black matrix 11 is formed at the substrate 10 outside the display area D to prevent light leakage.

A printed circuit board 100 is positioned outside of the substrate 10 in the horizontal direction to output gate and data electrical signals for driving the device. The printed circuit board 100, and the substrate 10 are electrically connected to each other via data signal transmission films 110. A data driving IC 130 is mounted on each data signal transmission film 110 to provide picture signals. The data signal transmission film 110 is also provided with a plurality of data signal lines 114, and a plurality of first gate signal wires 115. The data signal lines 114 are connected to the data lines 61 at contact portions C2 to relay the picture signals issued from the data driving IC 130 to the data lines 61.

A plurality of gate signal transmission films 120 are arranged at the left side of the substrate 10 in the vertical direction while being electrically connected thereto. A gate driving IC 140 is mounted on each gate signal transmission film 120 to issue scanning signals or gate signals. Each gate signal transmission film 120 is also provided with a plurality of second gate signal wires 124, and gate signal lines 126 connected to the gate lines 21 at connection or contact portions C1 to relay the gate signals issued from the gate driving IC 140 to the gate lines 21.

Gate signal interconnection wires 134 are arranged at the left top corner portion of the substrate 10 external to the display area D. The gate signal interconnection wires 134 connect the first gate signal wires 115 of the data signal transmission film 110 with the second gate signal wires 124 of the gate signal transmission film 120 at contact portions C4 and C3.

Third gate signal wires 136 are formed at the left side of the substrate 10 external to the display area D. The third gate signal wires 136 interconnect the second gate signal wires 124 of the neighboring gate signal transmission films 120 at the contact or pad portions C5 and C6.

The substrate 10, and the plurality of signal lines or wires 114, 115, 61, 134, 124, 126 and 136 are provided with pads at the pad or contact portions C1 through C6, and connected to each other via the pads using an anisotropic conductive film.

In the above-structured liquid crystal display, the gate electrical signals issued from the printed circuit board 100 are transmitted to the gate signal interconnection wires 134 via the first gate signal wires 115. The gate electrical signals are then sent to the gate driving IC 140 via the second gate signal wires 124, or transmitted to the third gate signal wires 136. Thereafter, the gate electrical signals are partially converted into gate signals at the gate driving IC 140, and the gate signals are sent to the gate lines 21 through the gate signal lines 126. That is, the gate electrical signals issued from the printed circuit board 100 are partially sent to the gate lines 21 via the first to third gate signal wires 115, 124 and 136, and the gate signal interconnection wires 134.

Meanwhile, in addition to the data signal transmission films 110, separate signal transmission films may be provided to connect the printed circuit board 100 to the substrate 10. In this structure, the first gate signal wires 115 would be formed at the separate signal transmission films.

The main structure of the TFT array substrate according to the first preferred embodiment will be now described with reference to FIGS. 2 to 6.

Figure 2:
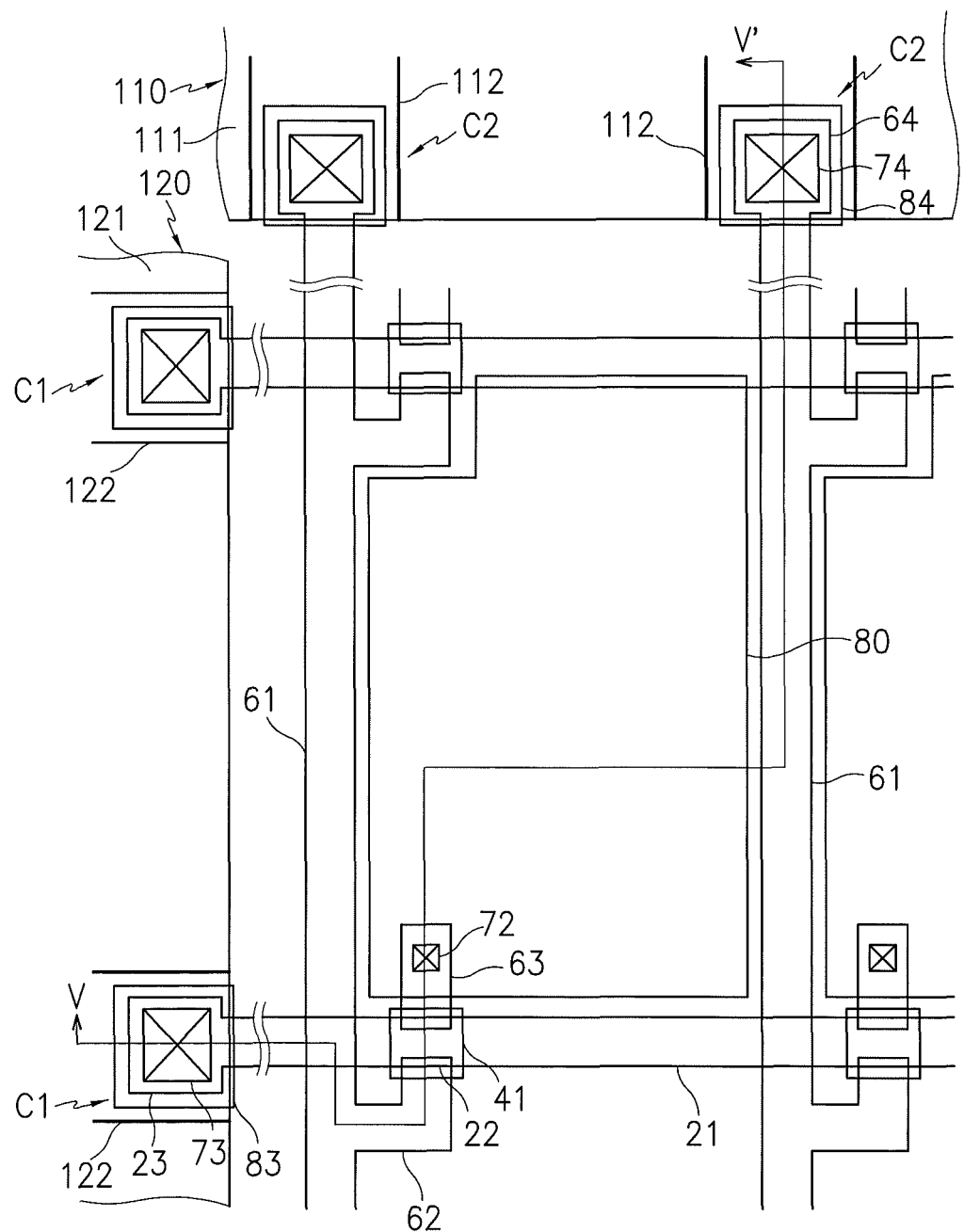
FIG. 2 is a partial amplified view of the TFT array substrate shown in FIG. 1 where the pixel area and the pad area are illustrated.
Figure 3:
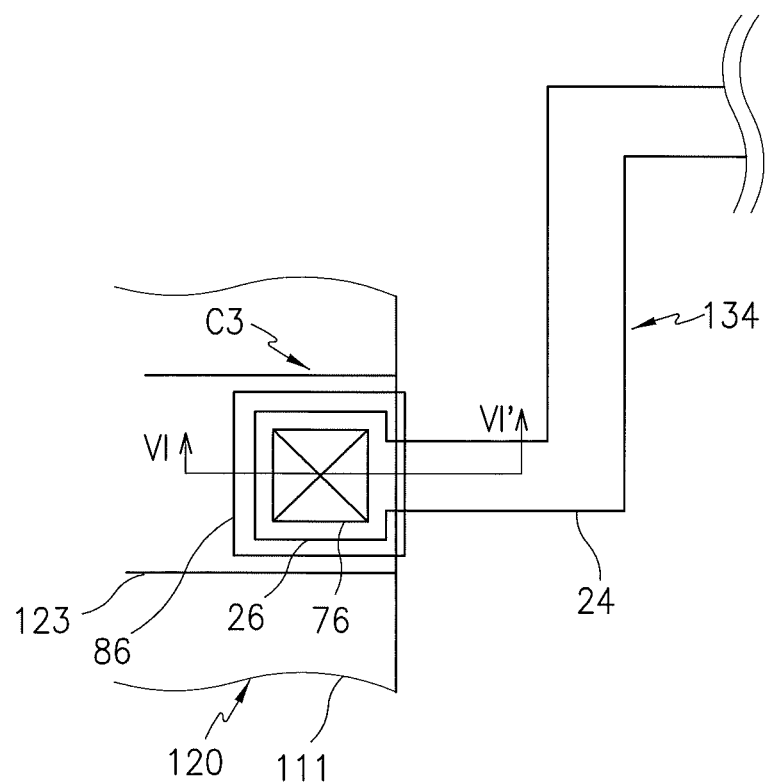
FIGS. 3 and 4 are partial amplified views of the TFT array substrate shown in FIG. 1 where gate signal wiring structures and contact or pad portions are specifically illustrated.
Figure 4:
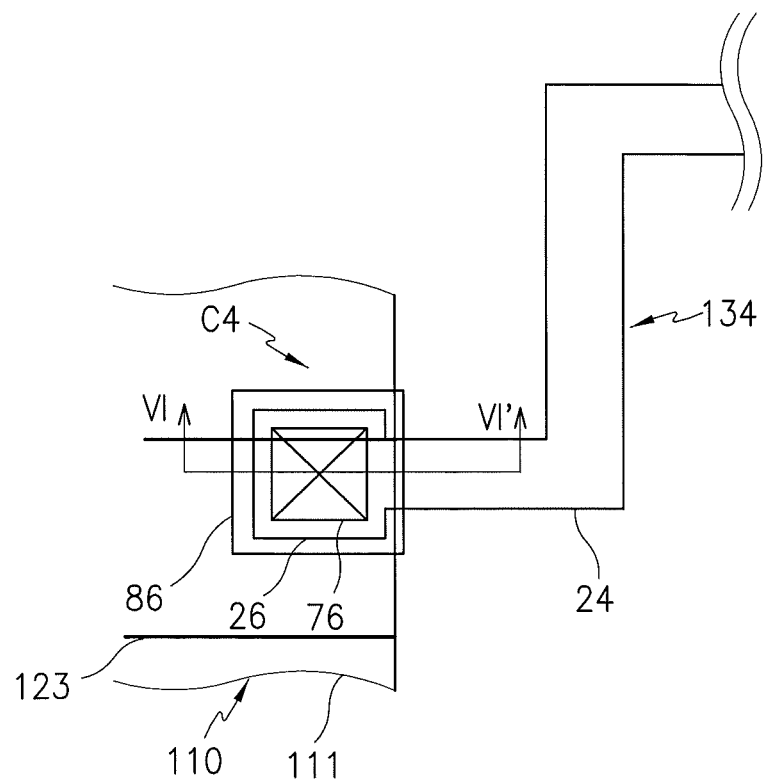
Figure 5:
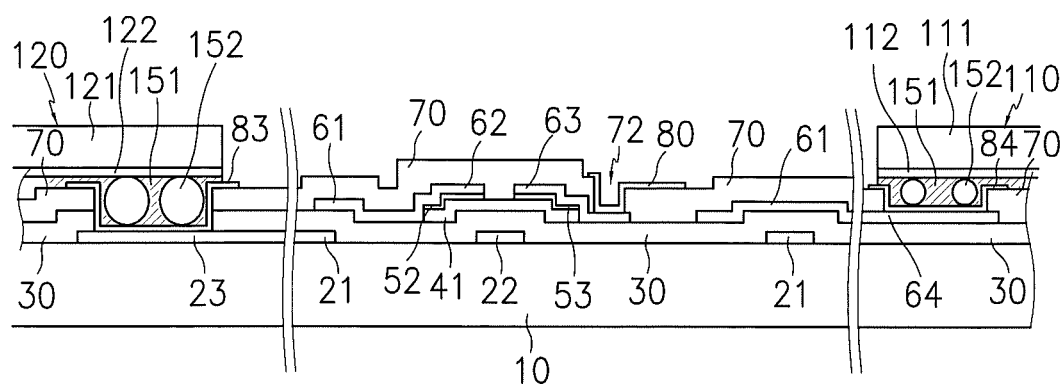
FIG. 5 is a cross sectional view of the TFT array substrate taken along the V-V' line of FIG. 2.
Figure 6:
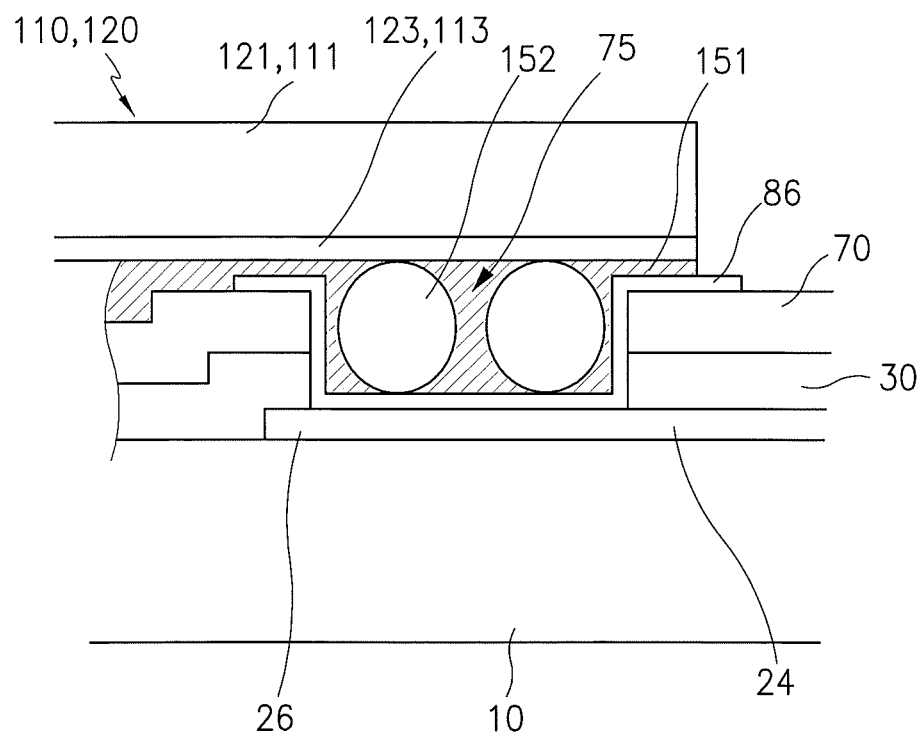
FIG. 6 is a cross sectional view of the TFT array substrate taken along the VI-VI' line of FIG. 3 or 4.

FIG. 2 is a partial amplified view of the TFT array substrate shown in FIG. 1 where the pixel area P and the pad portions C1 and C2 are specifically illustrated. FIGS. 3 and 4 are partial amplified views of the TFT array substrate shown in FIG. 1 where the gate signal wiring structure and the contact or pad portions C3 and C4 are specifically illustrated. FIG. 5 is a cross sectional view of the TFT array substrate taken along the V-V' line of FIG. 2, and FIG. 6 is a cross sectional view of the TFT array substrate taken along the VI-VI' line of FIG. 3 or 4. Since the contact portions C3 and C4 bear the same structure, only one contact portion is illustrated in FIG. 6.

The pixel area P, the contact portions C1 to C4, and the gate signal interconnection wires 134 will be first introduced while omitting detailed description of the third gate signal wires 136, and the contact portions C5 and C6 because they have the same structure as the gate signal interconnection wires 134, and the contact portions C3 and C4.

As shown in FIG. 2, a gate line assembly is formed on the insulating substrate 10 at the same plane as the gate signal interconnection wires 134 with a metallic or conductive material such as Al or Al alloy, Mo or MoW alloy, Cr, and Ta.

The gate line assembly includes a plurality of gate lines 21, gate electrodes 22 part of the gate lines 21, and gate pads 23 connected to the end portions of the gate lines 21 to receive scanning signals from the outside and transmit them to the gate lines 21. Each gate signal interconnection wire 134 is provided with a gate signal interconnection line 24, and gate signal interconnection pads 26 connected to both ends of the gate signal interconnection line 24.

The gate line assembly, and the gate signal interconnection wires 134 may have a single-layered structure, or a multiple-layered structure. In the case of a double-layered structure, one layer is formed with a material bearing a lower resistance, and the other layer is formed with a material bearing good contact characteristics with other materials. For example, the double-layered structure may be formed with a chrome-based layer and an aluminum alloy-based layer, or a molybdenum or molybdenum-based layer and an aluminum-based layer.

A gate insulating layer 30 is formed on the substrate 10 with silicon nitride while covering the gate line assembly and the gate signal interconnection wires 134.

A semiconductor pattern 41 is formed on the gate insulating layer 30 over each gate electrode 22 with amorphous silicon. Ohmic contact patterns 52 and 53 are formed on the semiconductor pattern 41 with amorphous silicon doped with n-type impurities such as P, and separated from each other around the gate electrode 22.

A data line assembly is formed on the ohmic contact patterns 52 and 53, and the gate insulating layer 30 with a metallic or conductive material such as Al or Al alloy, Mo or MoW alloy, Cr, and Ta.

The data line assembly includes a plurality of data lines 61, source electrodes 62 branched from the data lines 61, drain electrodes 63 separated from the source electrodes 62 while interposing the gate electrodes 21 between them, and data pads 64 connected to the data lines 61 to receive picture signals from the outside and transmit them to the data lines 61.

The data line assembly may have a single-layered structure, or a multiple-layered structure. In the case of a double-layered structure, one layer is formed with a material bearing a lower resistance, and the other layer is formed with a material bearing good contact characteristics with other materials.

Each TFT is formed with the gate electrode 22, the semiconductor pattern 41, and source and drain electrodes 62 and 63.

A protective layer 70 is formed on the data line assembly and the gate insulating layer 30 exposed through the data line assembly with silicon nitride or organic insulating material. The protective layer 70 has contact holes 73 exposing the gate pads 23 together with the gate insulating layer 30 at the contact portions C1, contact holes 74 exposing the data pads 64 at the contact portions C2, and contact holes 72 exposing the drain electrodes 63 at the pixel areas P. Furthermore, the protective layer 70 further has contact holes 76 exposing the gate signal interconnection pads 26 together with the gate insulating layer 30 at the contact portions C3 and C4.

Pixel electrodes 80, subsidiary gate pads 83, subsidiary data pads 84, and subsidiary gate signal interconnection pads 86 are formed on the protective layer 70 with a transparent conductive material such as indium tin oxide (ITO), or indium zinc oxide (IZO).

The pixel electrodes 80 are connected to the drain electrodes 63 through the contact holes 72 to receive picture signals. The subsidiary gate and data pads 83 and 84 are connected to the gate and data pads 64 through the contact holes 73 and 74 to protect them, and enhance adhesion thereof to external circuits.

The subsidiary gate signal interconnection pads 86 are connected to the gate signal interconnection pads 26 through the contact holes 76.

In the meantime, the gate signal transmission film 120 has gate signal leads 122 overlaid with an insulating resin layer 121. Each gate signal lead 122 is physico-electrically connected to the subsidiary gate pad 83 via an anisotropic conductive film with conductive particles 152 and adhesives 151. The gate signal lead 122 completely covers the contact hole 73 in the longitudinal direction as well as in the direction of width. The gate signal lead 122 may or may not completely cover the contact hole 73 or the subsidiary gate pad 83.

The data signal transmission film 110 has a data signal lead 112 overlaid with an insulating resin layer 111. The data signal lead 112 is physico-electrically connected to the subsidiary data pad 84 via an anisotropic conductive film with conductive particles 152 and adhesives 151. The data signal lead 112 may or may not completely cover the contact hole 74 or the subsidiary data pad 84.

In the gate and data signal transmission films 110 and 120 at the contact portions C3 and C4, gate signal interconnection leads 123 are formed under the insulating resin layers 111 and 121. The gate signal interconnection leads 123 are connected to the subsidiary gate signal interconnection pads 86 via an anisotropic conductive film with conductive particles 152 and adhesives 151, thereby electrically interconnecting the first and second gate signal wires 115 and 124. The gate signal interconnection lead 123 completely covers the contact hole 76 of the protective layer 70 and the gate insulating layer 30 in the longitudinal direction as well as in the direction of width. As shown in FIG. 4, the gate signal interconnection lead 123 may cover at least one longitudinal side of the contact hole 76 or the subsidiary gate signal pad 86. The gate signal interconnection lead 123 may or may not completely cover the subsidiary gate signal pad 86.

In the above structure, the gate signal interconnection leads 123 or the anisotropic conductive films of the gate and data signal transmission films 110 and 120 completely cover the contact hole 76 over the subsidiary gate signal interconnection pads 86 so that corrosion does not occur at the pad portions C3 and C4, and adhesion can be strengthened at those portions.

In order to further enhance contact characteristics at the contact portions C3 and C4, it may be controlled that stepped difference at the contact hole 86 should be minimized. For this purpose, the interconnection line of the gate signal interconnection wire 134 may be formed at the same plane as the data line assembly.

Figure 7A:
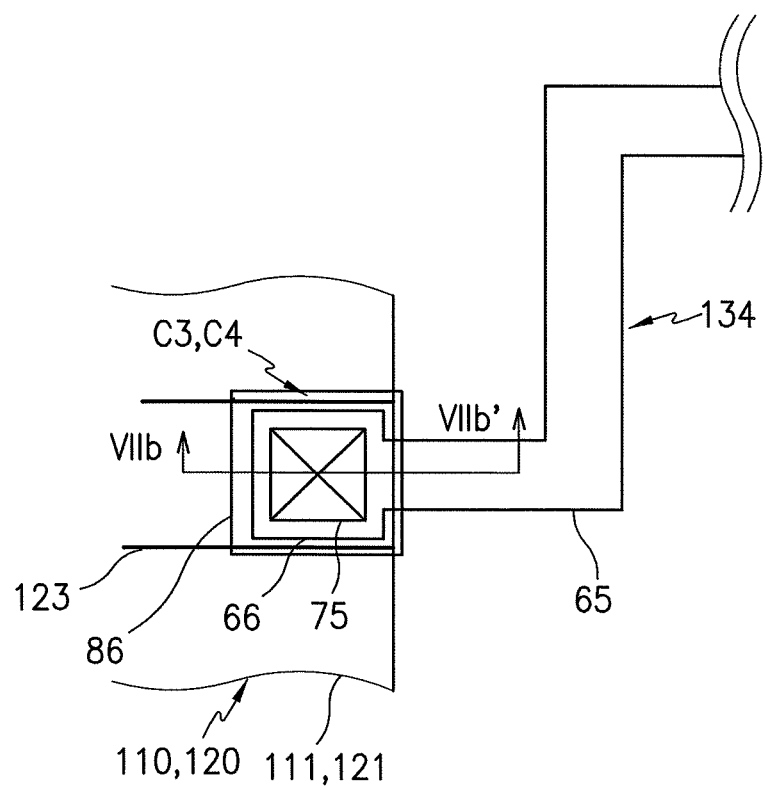
FIGS. 7A and 7B are plan views of a TFT array substrate for a liquid crystal display according to a second preferred embodiment where a gate signal interconnection wire is illustrated.
Figure 7B:
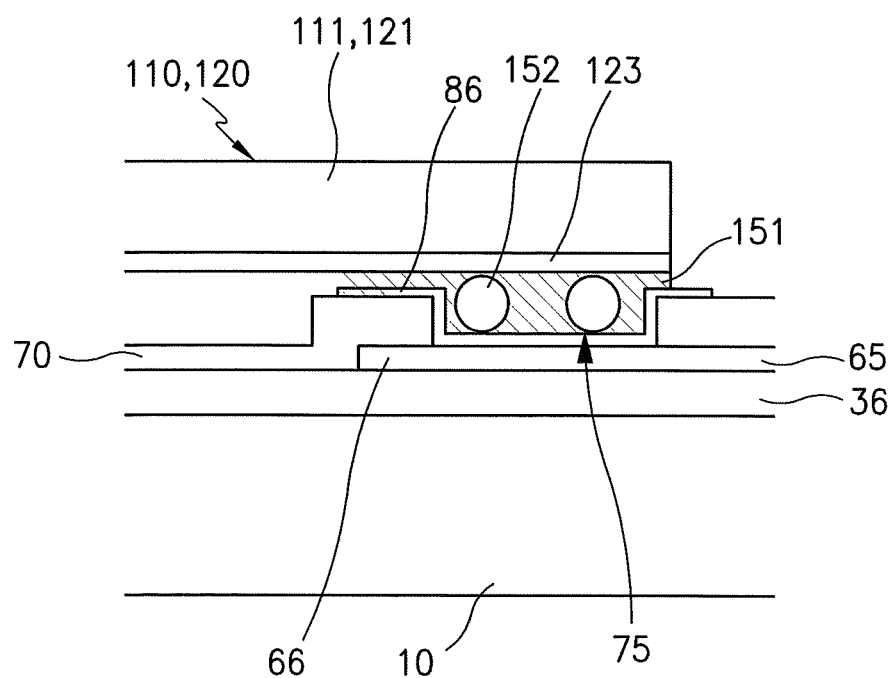

FIGS. 7A and 7B illustrate the wiring structure of a TFT array substrate according to a second preferred embodiment of the present invention.

In this preferred embodiment, other components and structures of the TFT array substrate are the same as those related to the first preferred embodiment except that gate signal interconnection lines 65 and gate signal interconnection pads 66 of the gate signal interconnection wires 134 are placed at the same plane as the data line assembly on the gate insulating layer 30, and contact holes 75 exposing the gate signal interconnection pads 66 are only formed at the protective layer 70. The contact holes 75 are preferably formed to be smaller than the gate signal interconnection pads 66.

Figure 8A:
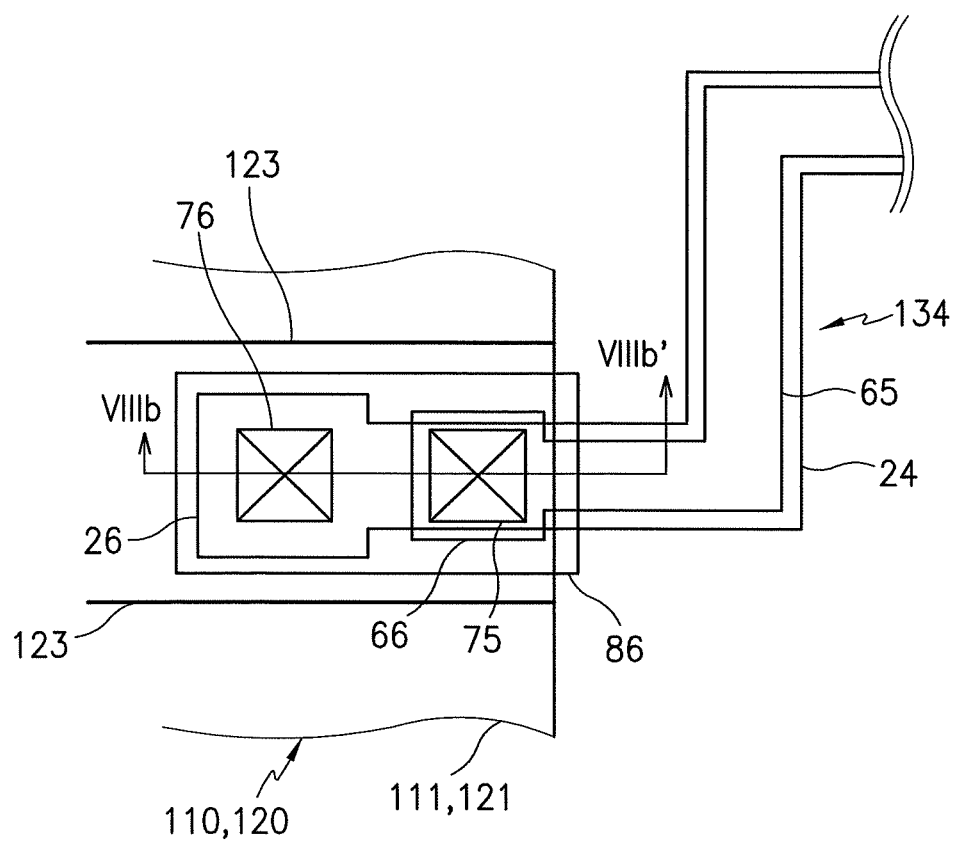
FIGS. 8A and 8B are plan views of a TFT array substrate for a liquid crystal display according to a third preferred embodiment where a gate signal interconnection wire is illustrated.
Figure 8B:
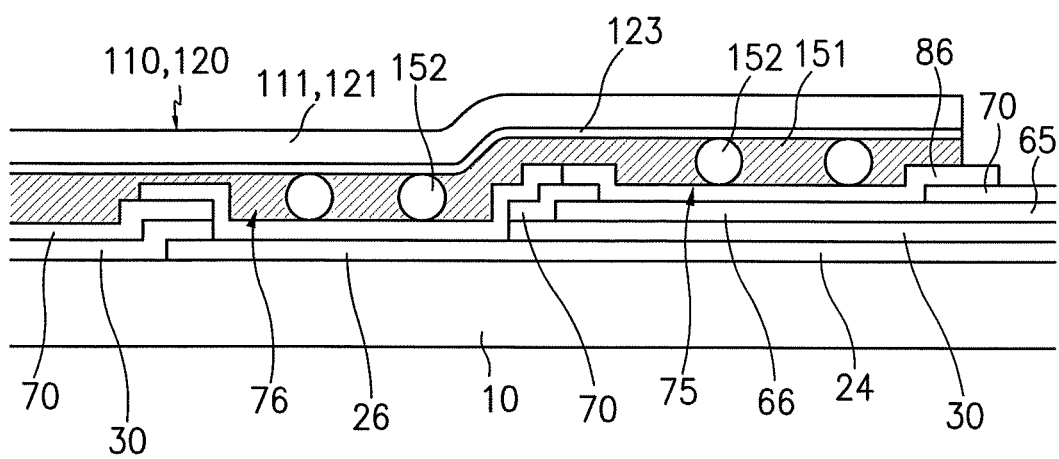

FIGS. 8A and 8B illustrate the wiring structure of a TFT array substrate according to a third preferred embodiment of the present invention. In this preferred embodiment, other components and structures of the TFT array substrate are the same as those related to the first preferred embodiment except for the following features.

As shown in FIGS. 8A and 8B, each gate signal interconnection wire 134 has double-structured gate signal interconnection lines 24 and 65 with gate signal interconnection pads 26 and 66 that are placed at the same plane as the gate line assembly and the data line assembly, respectively. The gate insulating layer 30 and the protective layer 70 together have contact holes 76 exposing the gate signal interconnection pads 26, and the protective layer 70 only has contact holes 75 exposing the gate signal interconnection pads 66. The subsidiary gate signal interconnection pads 86 are connected to the gate signal interconnection pads 26 and 66 through the contact holes 75 and 76, thereby electrophysically interconnecting the gate signal interconnection lines 24 and 65. In this structure, the contact failure due to the stepped difference is reduced while compensating for short circuits of the gate signal interconnection lines 24 and 65 and minimizing the wiring resistance. The overlying gate signal interconnection pads 66 may be extended toward the underlying gate signal interconnection pads 26. In this case, the aforementioned effects can be obtained, and further, it can be prevented that the moisture content is introduced into the pad portions C3 and C4.

The reinforcement of the pad portions C3 and C4 based on the double-structured pads 26 and 66 may be applied to other pad portions C1, C2, C5 and C6 in the same manner. The structures illustrated in FIGS. 7A to 8B may be selectively applied to the plurality of gate signal interconnection wires 134.

A method for fabricating a TFT array substrate will be now described with reference to FIGS. 2 to 8B.

A conductive layer is formed on an insulating substrate 10, and patterned to form a gate line assembly 21, 22 and 23, and a gate signal interconnection line assembly 24 and 26. Then, a gate insulating layer 30, an amorphous silicon-based layer, and a doped amorphous silicon-based layer are sequentially deposited onto the substrate 10. The amorphous silicon-based layer, and the doped amorphous silicon-based layer are patterned to thereby form a semiconductor pattern 41 and an ohmic contact pattern 51 over each gate electrode 22. At this time, the semiconductor pattern may be left over the gate signal interconnection line 24. Thereafter, a conductive layer is deposited, and patterned to thereby form a data line assembly 61 to 64. At this time, as shown in FIGS. 7A to 8B, a gate signal interconnection assembly 65 and 66 may be formed together at the same plane as the data line assembly 61 to 64. The portion of the ohmic contact pattern 51 exposed between the source and drain electrodes 62 and 63 is removed, thereby separating it into two patterns 52 and 53 while exposing the semiconductor pattern 41. A protective layer 70 is deposited onto the substrate 10, and patterned to thereby form contact holes 72 to 76. Thereafter, a transparent conductive material is deposited, and patterned to thereby form pixel electrodes 80, subsidiary gate pads 83, subsidiary data pads 84, and subsidiary gate signal interconnection pads 86.

Although the semiconductor pattern 41, and the data line assembly 61 to 64 are formed through different processing steps, they may be formed through one etching process. In such a process, a mask partially differentiated in light transmission is used to form photoresist patterns having different thickness. The semiconductor layer 41, and the data line assembly 61 to 64 are patterned together using the above mask as etching mask. In the patterning process, the photoresist pattern of a middle thickness is positioned over the channel portion between the source and drain electrodes 62 and 63, and the photoresist pattern with a large thickness positioned over the area where the data line assembly 61 to 64 are formed. In the resulting structure, ohmic contact patterns and semiconductor patterns are formed under the data line assembly 61 through 64, and the gate signal interconnection line assembly 65 and 66. The ohmic contact patterns 52 and 53 are formed along the shape of the data line assembly 61 to 64, and the gate signal interconnection line assembly 65 and 66. The semiconductor pattern 41 is also formed along the shape of the data line assembly 61 to 64, and the gate signal interconnection line assembly 65 and 66 except for the channel portion between the source and drain electrodes 62 and 63.

As described above, the contact portions are covered by leads, and the stepped difference at the contact portions is minimized. The gate signal interconnection line assembly is established to have a double-lined structure. This prevents short circuits of the wiring lines while keeping a moisture-free state, thereby obtaining good contact characteristics.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A liquid crystal display, comprising:
a substrate comprising:
at least one gate line extending to a first direction;
at least one data line extending to a second direction;
at least one switching element, the switching element connected to the gate line and the data line;
a gate signal interconnection line assembly including
at least one gate signal interconnection line,
at least one first gate signal interconnection pad, the first gate signal interconnection pad connected to one end of the gate signal interconnection line, and
at least one second gate signal interconnection pad, the second gate signal interconnection pad connected to the other end of the gate signal interconnection line; and
an insulating layer including
at least one first contact hole exposing the first gate signal interconnection pad, and
at least one second contact hole exposing the second gate signal interconnection pad;
a gate signal transmission film attached to said substrate, and including
a gate driving integrated circuit to receive a gate electrical signal and send a gate signal to the gate line,
at least one first gate signal wire, and at least one first gate signal lead connected to the first gate signal interconnection pad through the first contact hole; and
a data transmission film attached to said substrate, and including
at least one data signal line,
at least one second gate signal wire, and
at least one second gate signal lead connected to the second gate signal interconnection pad through the second contact hole, wherein the first gate signal lead completely covers the first contact hole at least in a longitudinal direction of the first gate signal lead, and wherein the data line is connected to the data signal line.

2. The liquid crystal display of claim 1, wherein the second gate signal lead completely covers the second contact hole at least in a longitudinal direction of the second gate signal lead.

3. The liquid crystal display of claim 2, wherein the substrate further comprises:
at least one pixel electrode formed on the insulating layer, and connected to the switching element;
at least one first subsidiary gate signal interconnection pad formed between the first signal interconnection pad and the first gate signal lead, on the same plane as the pixel electrode, and covering the first contact hole; and
at least one second subsidiary gate signal interconnection pad formed between the second signal interconnection pad and the second gate signal lead, on the same plane as the pixel electrode, and covering the second contact hole.

4. The liquid crystal display of claim 3, wherein the gate signal interconnection line comprises a first gate signal interconnection line formed on the same plane as the gate line, and a second gate signal interconnection line formed on the same plane as the data line.

5. The liquid crystal display of claim 4, wherein the first gate signal interconnection line and the second gate signal interconnection line are connected to each other via the first subsidiary gate signal interconnection pad and the second subsidiary gate signal interconnection pad.

6. The liquid crystal display of claim 1, wherein the insulating layer comprises a gate insulating layer covering the gate line, and a protective layer covering the data line over the gate insulating layer.

7. The liquid crystal display of claim 1, wherein the gate signal interconnection line assembly is formed on the same plane as the gate line, and the first contact hole and the second contact hole are formed through a gate insulating layer covering the gate line and a protective layer covering the data line.

8. The liquid crystal display of claim 1, wherein the gate signal interconnection line assembly is formed on the same plane as the data line, and the first contact hole and the second contact hole are formed through a protective layer covering the data line.

9. The liquid crystal display of claim 1, wherein the first gate signal lead completely covers the first contact hole, and the second gate signal lead completely covers the second contact hole.

10. The liquid crystal display of claim 1, wherein the data transmission film further comprises a data driving integrated circuit to receive a data electrical signal and send a data signal to the data line.

11. The liquid crystal display of claim 10, further comprising a printed circuit board connected to the data signal transmission films to send the gate electrical signal and the data electrical signal to the gate driving integrated circuit and the data driving integrated circuit.

12. A liquid crystal display, comprising:
a substrate comprising:
at least one gate line extending to a first direction;
at least one data line extending to a second direction;
at least one switching element, the switching element connected to the gate line and the data line;
a gate signal interconnection line assembly transmitting a gate electrical signal, and the gate signal interconnection line assembly including:
at least one gate signal interconnection line;
at least one first gate signal interconnection pad, the first gate signal interconnection pad formed at one end of the gate interconnection line; and
at least one second gate signal interconnection pad, the second gate signal interconnection pad formed at the other end of the gate interconnection line; and
an insulating layer including:
at least one first contact hole exposing the first gate signal interconnection pad; and
at least one second contact hole exposing the second gate signal interconnection pad, wherein the first gate signal interconnection pad and the second gate signal interconnection pad are formed on the same plane as the data lines, and
a data signal transmission film attached to the substrate, the data signal transmission film including:
a data driving integrated circuit to receive a data electrical signal and send a data signal to the data line;
at least one data signal line;
at least one second gate signal wire; and
at least one second gate signal lead connected to the second gate signal interconnection pad through the second contact hole, wherein the data line is connected to the data signal line.

13. The liquid crystal display of claim 12, the substrate further comprising at least one pixel electrode formed on the insulating layer, and connected to the switching element.

14. The liquid crystal display of claim 12, the substrate further comprising:
at least one pixel electrode formed on the insulating layer, and connected to the switching element; and
at least one first subsidiary gate signal interconnection pad disposed on the first gate signal interconnection pad, wherein the first subsidiary gate signal interconnection pad is disposed on the same plane as the pixel electrodes, the first subsidiary gate signal interconnection pad is covering the first contact hole.

15. The liquid crystal display of claim 12, wherein the insulating layer comprises a gate insulating layer covering the gate line, and a protective layer covering the data line over the gate insulating layer.

16. The liquid crystal display of claim 12, further comprising a gate signal transmission film attached to the substrate, the gate signal transmission film including:
a gate driving integrated circuit to receive the gate electrical signal and send a gate signal to the gate line;
at least one first gate signal wire; and
at least one first gate signal lead connected to the first gate signal interconnection pad through the first contact hole.

17. The liquid crystal display of claim 12, the substrate further comprising:
at least one pixel electrode formed on the insulating layer and connected to the switching element; and
at least one second subsidiary gate signal interconnection pad formed between the second subsidiary gate signal interconnection pad and the second gate signal lead, on the same plain as the pixel electrode, and covering the second contact hole.

18. The liquid crystal display of claim 1, further comprising an anisotropic conductive film completely covering the first contact hole at least in a longitudinal direction of the first gate signal lead.

19. The liquid crystal display of claim 12, further comprising an anisotropic conductive film completely covering the first contact hole.

20. A liquid crystal display, comprising:
a substrate;
at least one gate line disposed on the substrate;
at least one data line disposed on the substrate;
at least one switching element, the switching element connected to the gate line and the data line;
a first gate signal interconnection line assembly, which transmits at least one gate electrical signal, comprising at least one first gate signal interconnection line extending from a first side of the substrate to a second side of the substrate, and at least one second gate signal interconnection line disposed on the second side of the substrate;
a data signal transmission film attached to the first side of the substrate and connected to both of the data line and the first gate signal interconnection line;
a black matrix for reducing light leakage; and
a second gate signal interconnection line assembly, which transmits the gate electrical signal,
wherein at least a portion of the first gate signal interconnection line overlaps the black matrix,
the second gate signal interconnection line assembly comprising:
at least one third gate signal interconnection line extending from the first side of the substrate to the second side of the substrate; and
at least one fourth gate signal interconnection line disposed on the second side of the substrate, and
wherein the second gate signal interconnection line assembly is formed on the same plane as the gate line.

21. The liquid crystal display of claim 20, wherein the second gate signal interconnection line assembly further comprises at least one pair of third gate signal interconnection pads and at least one pair of fourth gate signal interconnection pads, the third gate signal interconnection pads formed at both ends of the third gate signal interconnection line, respectively, and the fourth gate signal interconnection pads formed at both ends of the fourth gate signal interconnection line, respectively.

22. The liquid crystal display of claim 20, wherein the second gate signal interconnection line assembly is disposed below the first gate signal interconnection line assembly.

23. The liquid crystal display of claim 1, wherein the first gate signal interconnection pad is formed on the same plane as the data line.

24. The liquid crystal display of claim 23, wherein the second gate signal interconnection pad formed on the same plane as the data line.

25. The liquid crystal display of claim 1, wherein the first gate signal interconnection pad comprises a third gate signal interconnection pad and a fourth gate signal interconnection pad disposed on the third gate interconnection pad.

26. The liquid crystal display of claim 25, wherein the substrate further comprises:
at least one pixel electrode formed on the insulating layer;
at least one first subsidiary gate signal interconnection pad formed between the first signal interconnection pad and the first gate signal lead, on the same plane as the pixel electrode, and covering the first contact hole; and
at least one second subsidiary gate signal interconnection pad formed between the second signal interconnection pad and the second gate signal lead, on the same plane as the pixel electrode, and covering the second contact hole.

27. The liquid crystal display of claim 26, wherein the third gate signal interconnection pad and the fourth gate signal interconnection pad are connected to each other via the first subsidiary gate signal interconnection pad.

28. The liquid crystal display of claim 25, wherein the second gate signal interconnection pad comprises a fifth gate signal interconnection pad and a sixth gate signal interconnection pad which is disposed on the fifth gate interconnection pad.

29. The liquid crystal display of claim 12, the gate signal interconnection line assembly further comprising:
at least one third gate signal interconnection pad, the third gate signal interconnection pad disposed below the first gate signal interconnection pad; and
at least one fourth gate signal interconnection pad, the fourth gate signal interconnection pad disposed below the second gate signal interconnection pad.

30. The liquid crystal display of claim 29, wherein the substrate further comprises:
at least one pixel electrode formed on the insulating layer;
at least one first subsidiary gate signal interconnection pad formed on the same plane as the plurality of pixel electrode, the first subsidiary gate signal interconnection pad connecting the first and third gate signal interconnection pads; and
at least one second subsidiary gate signal interconnection pad formed on the same plane as the pixel electrode, the second subsidiary gate signal interconnection pad connecting the second and fourth gate signal interconnection pads.

31. The liquid crystal display of claim 1, wherein the substrate further comprises a black matrix for reducing light leakage, wherein at least a portion of the gate signal interconnection line is overlapped with the black matrix.

* * * * *